UNITED STATES PATENT OFFICE 2,409,950

NONAQUEOUS GEL

Hughan C. Meyer, Jr., Philadelphia, Pa., assignor to Foote Mineral Company, Philadelphia, Pa., a corporation of Pennsylvania No Drawing. Application August 1, 1944, Serial No. 547,632

16 Claims. (Cl. 252—40)

This invention relates to novel non-aqueous gels of advantageous properties, and more particularly it relates to the stabilization of non-aqueous gels so that the tendency for the oleaginous material to bleed from the gel is materially reduced or prevented.

The production of non-aqueous gels from a mixture comprising oleaginous materials and thickening or gelling agents, for example, metal soaps, is common practice and such gels are in wide commercial use. These non-aqueous gels are used in many divergent applications, for instance, as lubricating greases; as protective coatings for the prevention of disintegration or deterioration of wood, metal, and other objects; and as a means of obtaining in convenient solid form such volatile oleaginous materials as gasoline or kerosene.

The non-aqueous gels are subject to syneresis, and as a consequence thereof the oleaginous material tends to bleed and separate from the gel. Such bleeding is an objectionable characteristic of the gels; for example, it is one of the primary causes of the loss of lubricating qualities of a non-aqueous gel used as a grease and the efficacy of a non-aqueous gel protective coating decreases as bleeding occurs. Furthermore, the production of non-aqueous gels from volatile oleaginous materials is especially difficult since the volatile material generally has a much higher rate of bleeding than the more viscous oleaginous materials.

In an attempt to reduce the tendency of the non-aqueous gels to bleed, the amount of the gelling agent in the composition has been increased beyond the amount required for thickening or gelling purposes, but since it is desirable for economic reasons to employ as small an amount of the gelling agent as is possible, this expedient has not met with favor and in some instances stable gels have not been obtainable even by the use of greatly increased amounts of the gelling agent.

An additional source of instability in the usual non-aqueous gels arises from the fact that many commercial gelling agents (metal soaps) are not neutral in reaction. Frequently, free acid or alkali will cause instability to syneresis and bleeding in a non-aqueous gel and the consistency of the gel may be unfavorably altered. As a consequence, special care has been heretofore required in the selection and control of the raw materials as well as in the manufacturing procedures, and these factors have unfavorably influenced the economic aspects of the gels.

One object of the present invention is to provide a novel non-aqueous gel which is characterized by a reduction in syneresis and bleeding as compared to the same type of gel of the prior art.

Another object of the present invention is to provide a non-aqueous gel which is stabilized against syneresis and bleeding and which, therefore, does not possess the disadvantages of prior non-aqueous gels.

Still another object is to provide a non-aqueous gel comprising oleaginous material and a thickening or gelling agent, the properties of which are improved by the inclusion therein of a small amount of an additional material serving as a stabilization agent for the gel.

A further object is to provide a lubricating grease possessing all of the properties required in such a product, including stability against loss of lubricating qualities through bleeding during use of the product.

Other objects will be apparent from a consideration of this specification and the claims.

In accordance with the present invention, the non-aqueous gel is stabilized by an akaline earth metal salt of a saturated cyclic hydrocarbon carboxylic acid. The non-aqueous gel of the invention, therefore, comprises an oleaginous material, a soap, preferably a metal soap, serving as the gelling agent, and an alkaline earth salt of a saturated cyclic hydrocarbon carboxylic acid present in a small amount reducing the tendency of the gel to bleed. Preferably, the alkaline earth metal salt will be present in an amount to provide a stabilized gel in which the bleeding is substantially prevented. Furthermore, the small amount of the alkaline earth metal salt, in addition to reducing the bleeding, increases the consistency of the gel even in those instances where the gelling agent is not neutral but contains free acid or alkali which normally acts as an accelerator of degradation. This action of the alkaline earth salt is very unusual since the literature discloses that it is common practice to use certain metal salts of saturated cyclic hydrocarbon carboxylic acids to reduce the consistency of none-aqueous gels, even to the extent of making them fluid; see, for example, U. S. Patent No. 2,055,795.

The term "alkaline earth metal salt of a saturated cyclic hydrocarbon carboxylic acid" includes the calcium, barium, strontium, and magnesium salts of the acid and of these salts, the use of the calcium or strontium salt has been found to act especially advantageously. The term also includes both neutral and the basic salts of the alkaline earth metals, and mixtures of the neutral and basic salts may be employed, if desired. Furthermore, mixtures of two or more of the salts of different alkaline earth metals are also applicable for use.

The oleaginous material present in the gel may be any mineral, vegetable, animal, or fish oil or other oil and the gel may comprise mixtures of two or more oils; for example, the oleaginous material may be selected from the following:

1. Mineral oils or fractions thereof—lubricating oils, gasoline, kerosene, benzine, benzene, etc.
2. Vegetable oils—turpentine, corn oil, cottonseed oil, etc.
3. Animal oils—neat's-foot oil, etc.
4. Fish oil—black fish oil, sperm oil, etc.

Oleaginous materials when modified by such means as halogenation, hydrogenation, alkylation, and similar means are also useful. Depending upon the application intended, oleaginous materials of extremely low or extremely high viscosity may be used successfully. Lubricating oils from a viscosity of about 30 sec. at 100° F. to about 250 sec. at 210° F. and higher can be used if desired. Furthermore, paraffinic, naphthenic, asphaltic base oils or combinations and mixtures may be used and may be selected to provide gels of desired properties.

The thickening or gelling agent is a salt of a long straight chain carboxylic or fatty acid and mixtures of two or more salts of the same or of different fatty acids may be used if desired. These salts are commonly known as soaps.

The metals most often used in the soaps are the alkali metals: lithium, sodium, potassium, caesium, rubidium; the alkaline earth metals: calcium, barium, strontium, magnesium; and zinc and aluminum, although other metals may be used if desired. The ammonium soaps may, however, be employed.

The long straight chain carboxylic or fatty acids are of the type of myristic, palmitic, stearic, arachidic, behenic, oleic, linoleic, arachidonic, and ricinoleic. The commercial forms of these acids are generally mixtures, for example, commercial stearic acid, usually contains oleic, palmitic and similar acids as well as stearic acid. It is, therefore, intended that commercial stearic acid and other similar commercial acids be included in the term "long straight chain carboxylic or fatty acid" and that their salts be included in the term "soap", "stearate", or "salt of a straight chain carboxylic or fatty acid".

The non-aqueous gel may also include any other desired material such as an oxidation inhibitor, a compound favorably affecting the viscosity index, an oiliness-increasing agent and the like, and the anti-bleeding action of the alkaline earth metal salt of the type described may be supplemented, if desired, by the presence in the non-aqueous gel of another anti-bleeding agent. It is common practice to include a small quantity of water in many non-aqueous gels to act as a stabilizing agent, or for a similar function, and such art may be practiced within the limits of my invention. The ingredients may be compounded into gels in any appropriate manner such as the methods commonly used in the art in the production of non-aqueous gels. For example, the oleaginous material, the soap, the anti-bleeding agent, and any other addition agent may be mixed and heated at from 50° C. to 250° C. until fluid and homogeneous. At this point, the individual components of the mixture are usually visually indistinguishable. Variations of this procedure include the production of the gel at higher or lower temperatures; the use of pressure in manufacture of the gel; the use of special continuous production equipment; the production of the soap in situ from its components (i. e. a metal hydroxide and a glycerol ester of the fatty acid, or a metal carbonate and a fatty acid, or other combinations of components obvious to one skilled in the art); the addition of soaps to the oleaginous material after it has reached the compounding temperature or the addition of oleaginous material to the hot mixture of the components of the soap; and combination of these and other variations in manufacturing procedure. It is understood that any of these or other compounding methods may be employed in the practice of my invention without departing from the spirit thereof.

As is common practice, sufficient soap or gelling agent is used to thicken substantially the oleaginous material. Generally, this will require from 3% to 70% by weight of the gelling agent based on the total weight of the non-aqueous gel, but for most common greases, 3% to 30% gelling agent based on the total weight of the gel is sufficient. When more than one soap is used (e. g. lithium stearate and sodium stearate), the total soap content is within the ranges above described, but the amount of the individual soaps may vary widely according to the specific properties desired. It is understood that other additives which are commonly used to improve the viscosity index, oiliness, and oxidation resistance of the oleaginous material may be used over a wide concentration range which will be controlled by their specific properties and functions. All of these practices are known to those skilled in the art and they may be used in the practice of this invention.

The saturated cyclic hydrocarbon carboxylic acid used in the preparation of the alkaline earth metal salt may be any one of or a mixture of the saturated alicyclic acids. These acids contain three or more carbon atoms in ring formation and from one carboxyl (COOH) group per ring to two carboxyl groups for each carbon atom in the ring and do not contain any unsaturated carbon-to-carbon (double bond) linkage in the ring. The acid may be the simplest acid of this type which is represented by the general formula $C_nH_{2n-m}(COOH)_m$, where $m$ is a whole number of any value from and including $2n$ to and including 1. Examples of such acids are the mono- and polycarboxylic cyclopropanoic, cyclobutanoic, cyclopentanoic, cyclohexanoic, and cycloheptanoic acids, although it is to be understood that acids having more carbon atoms in the ring than seven may be used is desired. Of these acids, those containing five, six, or seven carbon atoms in the ring are preferred for use, for example, monocarboxylic cyclopentanoic acid, hexahydrobenzoic acids, and monocarboxylic cycloheptanoic. Instead of employing the simple type of acid represented by the above formula, the saturated alicyclic acid used may be any of the modified acids of this class, for instance, one of the methylcyclopentanoic acids. Thus, the acid may be modified by a substituent group which includes: aryl and/or alkyl radicals, unsaturated straight and/or branch chain radicals; substituted alkyl, aryl, and/or alkene radicals; and in addition, the saturated cyclic carboxylic acids may also be modified by addition of side groups comprising saturated cyclic hydrocarbons or by condensation to form groups of two or more saturated cyclic hydrocarbons chemically fused.

The various napthenic or "Maitland" acids obtainable from petroleum oils contain a mixture of the saturated cyclic hydrocarbon acids and are included herein within the term "a saturated cyclic hydrocarbon carboxylic acid." Due to the cheapness and availability of naphthenic acids, the alkaline earth metal salt employed to stabilize the non-aqueous gel in accordance with the present invention is advantageously a mixture of the alkaline earth metal salts of the saturated alicyclic acids present in the naphthenic acids, which mixture of salts is referred to herein as "an alkaline earth metal naphthenate." The actual composition of the naphthenic acids is unknown but they are believed to contain a mixture of the cyclic hydrocarbon carboxylic acids having from 5 to 23 carbon atoms in the ring, although there may be present acids with smaller or larger rings. Furthermore, it is likely that the mixture contains modified saturated hydrocarbon carboxylic acids of the type heretofore mentioned. Other constituents of petroleum from which the mixture of acids, known as naphthenic acids, are obtained may also be present. I have found, for example, that many types of commercial naphthenic acids give satisfactory results, when used as taught herein. Such commercial grades of naphthenic acids as "Advance Solvents Co's Grade A," "Harshaw Chemical Co's Grade 215–225AN," "Oronite Chemicals N," "Stanco's Aruba Dark," and "Colonial Beacon Oil Co's (Esso) Everett Refinery & Rectified Grades" were found to function satisfactorily.

The alkaline earth metal salt of a saturated cyclic hydrocarbon carboxylic acid is effective in small amounts to cause a reduction in the tendency of the non-aqueous gel to bleed. The amount employed may be varied over a range depending upon the type of gel, the ingredients of the gel, the physical conditions under which the finished gel is to function, and the particular alkaline earth metal salt employed. The amount of alkaline earth metal salt employed in any particular case will not be sufficient to affect deleteriously the consistency and other properties of the gel, and it has been found that as the amount is increased beyond that required for optimum stabilization of the gel, the stabilization against bleeding decreases until a point is reached where the alkaline earth metal salt is ineffective as a stabilizing agent. In case of any particular gel and stabilizing agent, there is an amount of alkaline earth metal salt which gives optimum stability, and as a preferred embodiment of the invention this optimum amount is employed. However, since both below and above the optimum amount there is a range wherein the alkaline earth metal salt reduces the tendency of the gel to bleed, the use of less or more than the optimum amount is within the scope of the invention. Generally, the amount of the alkaline earth metal salt of the saturated cyclic hydrocarbon carboxylic acid present in the non-aqueous gel will be between .001% and about 5.0%, preferably between 0.1% and 1.0% by weight based on the total weight of the non-aqueous gel.

The alkaline earth metal salts referred to may be made in a variety of ways, for instance, by reaction of the alkaline earth metal hydroxide, carbonate, oxide or other appropriate alkaline earth metal compound with the acid, or by double decomposition, such as the reaction of sodium naphthenate and calcium chloride or other soluble salt of the acid and an appropriate salt of an alkaline earth metal. The alkaline earth metal salt may be separately prepared or prepared in the presence of the oil and/or the soap. Many methods for the preparation of organic metal compounds are known to those skilled in the art and any of these methods may be satisfactorily used. In general, sufficient alkaline earth metal compound to react completely with all the carboxyl groups present (be the acids mono- or polycarboxylic) is provided, but satisfactory results can be obtained when an excess of acid is employed. As previously stated, since the alkaline earth metals are divalent, basic or neutral salts, or combinations of basic and neutral salts of the acid may be formed, and the various types of salts have been found to be effective for use. It is obvious that the alkaline earth metal salt disclosed may be compounded with the gel by numerous methods well known and practiced by those skilled in the art; for example, the alkaline earth metal salt, or the acid and an alkaline earth metal compound capable of reacting with the acid, may be merely mixed with the other ingredients or with a portion thereof which is subsequently combined with the remaining ingredients, and heat may be used if desired to facilitate mixing of the various ingredients. Thus, the alkaline earth metal salt or the components thereof may be mixed with the non-oleaginous material and this mixture may subsequent be incorporated with the oleaginous material. So long as the alkaline earth metal salt is incorporated before the final setting of the gel satisfactory results are obtained and, therefore, any suitable method of incorporation is applicable for use.

Referring specifically to non-aqueous gels applicable for use as a lubricating grease, the oleaginous material present in the gel will be a lubricating oil and greases of especially advantageous properties will be obtained when the grease comprises, in addition to the alkaline earth metal salt of the saturated cyclic hydrocarbon carboxylic acid, an alkali metal soap, particularly a lithium soap, such as lithium stearate. In this preferred embodiment, the lithium soap may serve as the sole thickening or gelling agent or the action of the lithium soap may be supplemented by the use of another metal soap, for example, mixtures of soaps of lithium and calcium, of lithium and sodium, of lithium, calcium and sodium, of lithium and aluminum or the like. The use of an alkaline earth metal soap or of an aluminum soap or of a mixture of two or more thereof, with the alkaline earth metal salt of the saturated cyclic hydrocarbon carboxylic acid, has also been found to be advantageous.

The following typical examples are illustrative of the non-aqueous gels of the invention and of the methods of compounding the gels and illustrate the action of the alkaline earth metal salt of the saturated cyclic hydrocarbon carboxylic acid but the examples are not to be considered restrictive of the invention:

*Example I*

A mixture was prepared from:

| | Parts by weight |
|---|---|
| Napthenic oil | 90 |
| Lithium stearate | 10 |

To 10 gram samples of the mixture there was added:

| Sample | |
|---|---|
| 1 | Blank |
| 2 | .03 gm. neutral calcium naphthenate |
| 3 | .03 gm. neutral barium naphthenate |
| 4 | .03 gm. neutral strontium naphthenate |
| 5 | .05 gm. neutral magnesium naphthenate |

These samples were heated to 200° C. to 250° C. and stirred until clear and homogeneous. On cooling, gels formed, and they were then tested for bleed as by the method given in "Army-Navy Aeronautical Specification Grease; Low Temperature Lubricating AN–G–3," May 30, 1942, section F–5–C. Briefly stated, this method consists in placing a 10 gm. sample of grease in a 60 mesh screen cone, heating the sample to 100° C. for fifty hours and weighing the oil lost by the grease. The bleed is calculated as percent of original sample. The results were:

| Sample | Bleed |
| --- | --- |
|  | Per cent |
| 1 | 12.0 |
| 2 | .1 |
| 3 | .03 |
| 4 | .02 |
| 5 |  |

*Example II*

A mixture was prepared from:

| | Parts by weight |
| --- | --- |
| Naphthenic oil | 90 |
| Lithium stearate | 10 |

To 10 gm. samples of the mixture there was added:

Sample
1 _____ Blank
2 _____ .05 gm. neutral strontium naphthenate
3 _____ .05 gm. basic strontium naphthenate These samples were compounded and tested for bleed as in Example I. The results were:

| Sample | Bleed |
| --- | --- |
|  | Per cent |
| 1 | 12 |
| 2 | 0 |
| 3 | 0 |

*Example III*

A mixture was prepared from:

| | Parts by weight |
| --- | --- |
| Paraffinic oil | 90 |
| Calcium stearate | 10 |

To 10 gm. samples of this material, there was added:

Sample
1 _____ Blank
2 _____ .05 gm. neutral magnesium naphthenate
3 _____ .05 gm. neutral strontium naphthenate These samples were heated to 50° C. to 150° C. and stirred until fluid and homogeneous. On cooling, a gel formed.

This gel was tested for bleed by allowing it to stand for 150 hours and observing oil separation. The blank (sample 1) showed considerable separation. The naphthenate-treated samples (2 and 3) showed no signs of separation.

When tested for penetration using the A. S. T. M. (American Society for Testing Materials) penetrometer with 20 gm. aluminum cone and plunger, using the sample cup and method described by Kaufman, Finn and Harrington in Industrial and Engineering Chemistry 11, 108, 1939, the results were as follows, the lower values indicating higher consistency:

| Sample | Penetration |
| --- | --- |
|  | Mm. |
| 1 | 87 |
| 2 | 76 |
| 3 | 74 |

*Example IV*

A mixture was prepared from:

| | Parts by weight |
| --- | --- |
| Naphthenic oil (medium vis. grade) | 90 |
| Lithium stearate | 10 |

To 10 gm. samples of the above mixture, there was added:

Sample
1 _____ Blank
2 _____ 0.5 gm. neutral strontium naphthenate
3 _____ 0.6 gm. neutral strontium naphthenate These samples were compounded as in Example I and tested for bleeding by the method given therein. The results were:

| | Per cent |
| --- | --- |
| 1 | 8.3 |
| 2 | 7.0 |
| 3 | 10.7 |

These examples are given to illustrate the improvements of the non-aqueous gels in regard to syneresis and bleeding, and penetration and consistency and to show that the neutral and basic alkaline earth metal salts are effective. The examples also show that the amount of the alkaline earth metal naphthenates needed to produce the desired effect is small and that the use of larger amounts is not required and in fact may produce undesirable effects.

The advantages of the non-aqueous gel of the invention as compared with those of the prior art will be obvious from the foregoing description and examples. In accordance with the invention, a stabilizing product against bleeding may be provided in cases where it was either impossible to obtain such a product previously or where the bleeding could only be decreased by the addition of a relatively large quantity of thickening agent; for example, by the present invention, a stable gel may be formed with the volatile oleaginous materials which usually have a much higher rate of bleed than the more viscous materials. Furthermore, a lubricating grease made in accordance with the invention will not lose its lubricating quality during use caused by the bleeding of the oleaginous material from the gel, and likewise the efficacy of a protective coating embodying the invention will not be decreased after it is applied to the surface to be protected.

Considerable modification is possible in the choice of the oleaginous material, the soap, and the alkaline earth metal salt of the saturated cyclic hydrocarbon carboxylic acid and in the proportions of these materials present in the non-aqueous gel, as well as in the methods employed in compounding the gel, without departing from the features of the invention.

I claim:

1. A non-aqueous gel comprising oleaginous material, a metal soap of a long chain carboxylic acid in an amount to substantially thicken said oleaginous material and to convert it into a gel and an alkaline earth metal salt of a saturated cyclic hydrocarbon carboxylic acid in an amount from .001% to about 5.0% reducing the tendency of the gel to bleed.

2. A non-aqueous gel comprising oleaginous material, a metal soap of a long chain carboxylic acid in an amount to substantially thicken said oleaginous material and to convert it into a gel, and an alkaline earth metal naphthenate in an amount from .001% to about 5.0% reducing the tendency of the gel to bleed.

3. A non-aqueous gel comprising oleaginous material, a metal soap of a long chain carboxylic acid in an amount to substantially thicken said oleaginous material and to convert it into a gel, at least a substantial portion of said soap being an alkali metal soap of said acid, and an alkaline earth metal naphthenate in an amount from .001% to about 5.0% reducing the tendency of the gel to bleed.

4. A non-aqueous gel comprising oleaginous material, a metal soap of a long chain carboxylic acid in an amount to substantially thicken said oleaginous material and to convert it into a gel, at least a substantial portion of said soap being a lithium soap of said acid, and an alkaline earth metal naphthenate in an amount from .001% to about 5.0% reducing the tendency of the gel to bleed.

5. A non-aqueous gel comprising an oleaginous material, a metal soap of a long chain carboxylic acid in an amount to substantially thicken said oleaginous material and to convert it into a gel, at least a substantial portion of said soap being an alkaline earth metal soap of said acid, and an alkaline earth metal naphthenate in an amount between .001% to about 5.0% reducing the tendency of the gel to bleed.

6. A non-aqueous gel comprising an oleaginous material, a metal soap of a long chain carboxylic acid in an amount to substantially thicken said oleaginous material and to convert it into a gel, at least a substantial portion of said soap being an aluminum soap of said acid, and an alkaline earth metal naphthenate in an amount from .001% to about 5.0% reducing the tendency of the gel to bleed.

7. A non-aqueous gel comprising a lubricating oil, a metal soap of a long chain carboxylic acid in an amount to substantially thicken said lubricating oil and to convert it into a gel, and an alkaline earth metal of a saturated cyclic hydrocarbon carboxylic acid in an amount from .001% to about 5.0% reducing the tendency of the gel to bleed.

8. A non-aqueous gel comprising a lubricating oil, a metal soap of a long chain carboxylic acid in an amount to substantially thicken said lubricating oil and to convert it into a gel, and an alkaline earth metal naphthenate in an amount from .001% to about 5.0% reducing the tendency of the gel to bleed.

9. A non-aqueous gel comprising a lubricating oil, a metal soap of a long chain carboxylic acid in an amount to substantially thicken said lubricating oil and to convert it into a gel, at least a substantial portion of said soap being a lithium soap of said acid and an alkaline earth metal naphthenate in an amount from .001% to about 5.0% reducing the tendency of the gel to bleed.

10. A non-aqueous gel comprising a lubricating oil, lithium stearate in an amount to substantially thicken said lubricating oil and to convert it into a gel, and an alkaline earth metal naphthenate in an amount from .001% to about 5.0% reducing the tendency of the gel to bleed.

11. A non-aqueous gel comprising a lubricating oil and a lithium salt of a long chain carboxylic acid in an amount to substantially thicken said lubricating oil and to convert it into a gel, substantially stabilized against bleeding by the inclusion therein of from .001% to about 5.0% of an alkaline earth metal naphthenate.

12. A non-aqueous gel comprising a lubricating oil, a metal soap of a long chain carboxylic acid in an amount to substantially thicken said lubricating oil and to convert it into a gel, and a calcium salt of a saturated cyclic hydrocarbon carboxylic acid in an amount from .001% to about 5.0% reducing the tendency of the gel to bleed.

13. A non-aqueous gel comprising a lubricating oil, a metal soap of a long chain carboxylic acid in an amount to substantially thicken said lubricating oil and to convert it into a gel, and calcium naphthenate in an amount from .001% to about 5.0% reducing the tendency of the gel to bleed.

14. A non-aqueous gel comprising a lubricating oil, and a metal soap of a long chain carboxylic acid in an amount to substantially thicken said lubricating oil and to convert it into a gel, and a strontium salt of a saturated cyclic hydrocarbon carboxylic acid in an amount from .001% to about 5.0% reducing the tendency of the gel to bleed.

15. A non-aqueous gel comprising a lubricating oil, and a metal soap of a long chain carboxylic acid in an amount to substantially thicken said lubricating oil and to convert it into a gel, and strontium naphthenate in an amount from .001% to 5.0% reducing the tendency of the gel to bleed.

16. A non-aqueous gel comprising oleaginous material, a soap of a long chain carboxylic acid in an amount to substantially thicken said oleaginous material and to convert it into a gel, and an alkaline earth metal salt of a saturated cyclic hydrocarbon carboxylic acid in an amount from .001% to about 5.0% reducing the tendency of the gel to bleed.

HUGHAN C. MEYER, JR.